United States Patent
Peterson

(10) Patent No.: US 9,100,171 B1
(45) Date of Patent: Aug. 4, 2015

(54) COMPUTER-IMPLEMENTED FORUM FOR ENABLING SECURE EXCHANGE OF INFORMATION

(75) Inventor: Kevin Peterson, Mountain View, CA (US)

(73) Assignee: Secure Forward, LLC, Mountain View, CA (US)

( * ) Notice: Subject to any disclaimer, the term of this patent is extended or adjusted under 35 U.S.C. 154(b) by 991 days.

(21) Appl. No.: 12/641,137

(22) Filed: Dec. 17, 2009

(51) Int. Cl.
*H04L 9/08* (2006.01)
*H04L 29/06* (2006.01)

(52) U.S. Cl.
CPC ............ *H04L 9/0833* (2013.01); *H04L 63/045* (2013.01); *H04L 63/062* (2013.01)

(58) Field of Classification Search
USPC .......... 713/168, 171; 726/26–29; 380/44, 277
See application file for complete search history.

(56) References Cited

U.S. PATENT DOCUMENTS

| | | | |
|---|---|---|---|
| 5,787,175 A | 7/1998 | Carter | |
| 5,790,790 A | 8/1998 | Smith et al. | |
| 5,864,667 A | 1/1999 | Barkan | |
| 6,035,402 A | 3/2000 | Vaeth et al. | |
| 6,061,448 A | 5/2000 | Smith et al. | |
| 6,105,131 A | 8/2000 | Carroll | |
| 6,215,872 B1 | 4/2001 | Van Oorschot | |
| 6,237,096 B1 | 5/2001 | Bisbee et al. | |
| 6,308,277 B1 | 10/2001 | Vaeth et al. | |
| 6,324,587 B1 | 11/2001 | Trenbeath et al. | |
| 6,385,655 B1 | 5/2002 | Smith et al. | |
| 6,438,690 B1 | 8/2002 | Patel et al. | |
| 6,584,466 B1 | 6/2003 | Serbinis et al. | |
| 6,651,166 B1 | 11/2003 | Smith et al. | |
| 6,684,248 B1 | 1/2004 | Janacek et al. | |
| 6,715,073 B1 | 3/2004 | An et al. | |
| 6,725,381 B1 | 4/2004 | Smith et al. | |
| 6,732,101 B1 | 5/2004 | Cook | |
| 6,775,782 B1 | 8/2004 | Buros et al. | |
| 6,795,920 B1 | 9/2004 | Bacha et al. | |
| 6,826,685 B1 | 11/2004 | Douglas | |
| 6,950,943 B1 | 9/2005 | Bacjha et al. | |
| 6,971,017 B2 | 11/2005 | Stringer et al. | |
| 6,978,364 B1 | 12/2005 | Balaz et al. | |
| 6,988,199 B2 | 1/2006 | Toh et al. | |
| 7,051,003 B1 | 5/2006 | Kobata et al. | |
| 7,149,894 B2 | 12/2006 | Futamura et al. | |
| 7,162,635 B2 | 1/2007 | Bisbee et al. | |
| 7,171,000 B1 | 1/2007 | Toh et al. | |
| 7,181,017 B1 | 2/2007 | Nagel et al. | |
| 7,185,199 B2 | 2/2007 | Balfanz et al. | |
| 7,251,728 B2 | 7/2007 | Toh et al. | |
| 7,356,834 B2 | 4/2008 | Smith et al. | |
| 2002/0059144 A1 | 5/2002 | Meffert et al. | |
| 2003/0108204 A1* | 6/2003 | Audebert et al. | 380/277 |
| 2006/0198517 A1* | 9/2006 | Cameron et al. | 380/44 |

* cited by examiner

*Primary Examiner* — Gilberto Barron, Jr.
*Assistant Examiner* — Devin Almeida
(74) *Attorney, Agent, or Firm* — Mahamedi Paradice LLP

(57) ABSTRACT

A secure communication forum is established through use of a network resource that is available to a host user and one or more forum users. The host user is validated and assigned a master key for his or her forum. Individual users who are to participate in the forum are assigned users keys that are validated with the master key. The forum is maintained for ongoing use for the users.

20 Claims, 6 Drawing Sheets

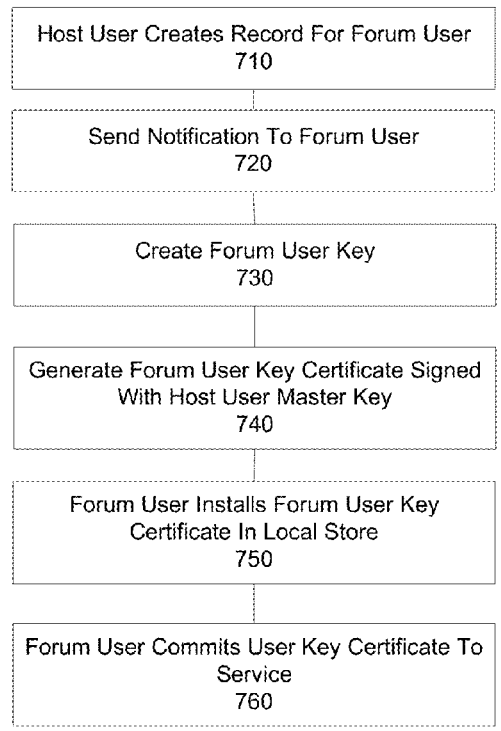
FIG. 7
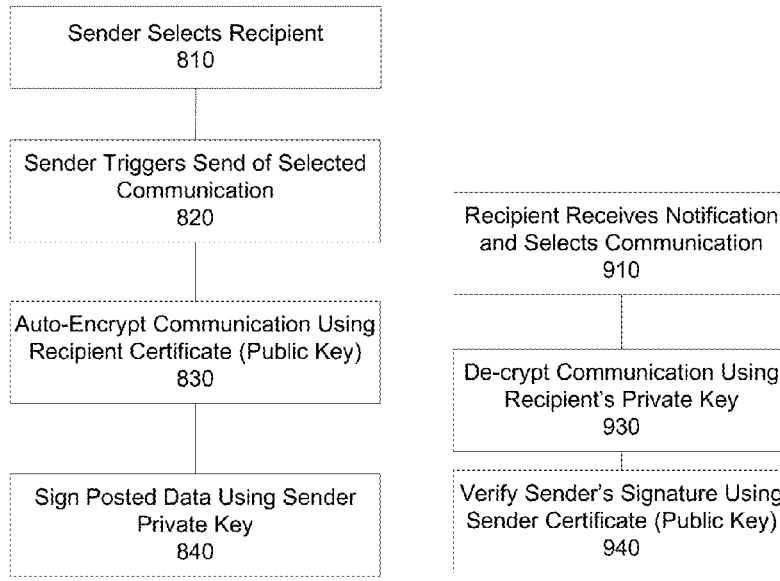
FIG. 8
FIG. 9

COMPUTER-IMPLEMENTED FORUM FOR ENABLING SECURE EXCHANGE OF INFORMATION

TECHNICAL FIELD

The disclosed embodiments relate generally to a computer-implemented method for enabling secure exchange of information.

BACKGROUND

Asymmetric key cryptography enables secure end to end communications using public-private encryption key pairs. Given knowledge of a recipient's public key, a sender can encrypt information in such a way that only the recipient who possesses the corresponding private key may decrypt and view that information. Public keys convey no information that will compromise the confidentiality of the transmission and may be freely shared with anyone. In contrast, private keys must never be shared. The obvious advantage of this system over symmetric key cryptographic systems is that secrets (e.g. passwords or keys) need not be shared between the sender and recipient in order to communicate privately.

To enable asymmetric key cryptography, the following is generally required: (i) the public key must be widely known or available, and (2) the identity associated with a public-private key pair must be trusted. A key certificate encapsulates identity information and binds it to a specific public-private key pair and a Certificate Authority (or CA) asserts the validity of this information. The validity of a given CA may in turn be asserted by another CA and the result is a hierarchical chain of trust that ends with a Root Certificate Authority, the trust of which is asserted by an alternate but definitive source of authority (e.g. MICROSOFT® asserts the validity of Root Certificate Authorities installed on Windows based computers). If the Root CA is trusted and all intermediate CAs are valid then the identity described by the original certificate is valid and the public-private key pair may be trusted. The term Public Key Infrastructure, or PKI, is used to describe the set of technologies needed for distributing and sharing certificates (and public keys) and asserting and verifying the validity of the identity in certificates bound to public-private key pairs.

Asymmetric key cryptography enables assertion and verification of identity in PKI through the use of digital signatures. A digital signature is created by encrypting with a private key instead of a public key; signature verification is performed by decrypting with the public key. Digital signatures preclude forgery and ensure authenticity as a result of two key premises: (1) public-private key pairs are unique and have one to one correspondence—for a given private key there exists only one matching public key and vice versa; (2) cryptographic hash functions used in creating digital signatures (e.g. SHA-256) create very good random numbers. For example, to sign and validate a certificate a CA first hashes the contents of the certificate and encrypts the result with its own private key to create a signature. A system wishing to verify the authenticity of the certificate decrypts the signature with the CA's public key and compares the result to a recomputed hash. If the decrypted signature matches the recomputed hash then the signature is valid and the certificate contains the information the CA intended. Forgery is not practically possible because (1) only the corresponding public key will correctly decrypt the signature for a given private key and (2) guessing the private key is hard because the data that's actually encrypted/signed (the result of the hash) is highly random and consequently, very little information about the private key is exposed even if many signatures are available for analysis.

Digital signatures are also used to bind a certificate to a specific public-private key pair. A request for a certificate includes the requestor's identifying information as well as its public key and the whole structure is signed by the requestor's private key. This signature binds the requestor's identity to its public-private key pair-only the possessor of the private key corresponding to the public key in the request could have signed the request. The CA verifies the requestor's signature and identity information, then creates a certificate from this identity information and the requestor's public key and signs the whole structure with its private key. Now, if the CA is trusted then the identity information in the certificate is trusted and known to correspond to one public-private key pair.

One implicit requirement in PKI systems is that the underlying functional components (e.g. hardware or software) that rely on the certificates and keys to perform cryptographic operations must ensure that certificates and the corresponding public-private key pairs are valid before using them. This is usually done by verifying the content and signature of each certificate in a chain of certificates up to a trusted Root Certificate before performing any operation or relying on a result.

PKI, in its entirety, is a complex technology, and solutions designed to manage this complexity are equally complex and consequently difficult to use and maintain. To encapsulate this complexity, PKI is typically managed separately from the applications that use it. Furthermore, applications that utilize PKI to send and receive encrypted confidential information are difficult to configure. As a result, the powerful combination of these technologies is out of reach for individuals and small business that lack the technical sophistication or resources.

PKI, on a large scale, with its hierarchies and chains of trust can enable secure and trusted communication between a large number of people, machines and services. For example, many online banking sites utilize PKI to manage their customer interactions, such as bill payment or security trades. In some European and Asian countries, government entities issue digital identities to their citizens and enable them to use online services such as filing tax returns that require strong, two-factor authentication. At a large scale, when all of the components are in place and well managed and maintained, PKI works relatively well.

Other data security infrastructures have included Rights of Management Service. Such technology controls access to information embedded in specific documents. In general, the author of a document provisions the recipient's rights to access the information before sending the document and when the recipient attempts to view the document it must first prove its identity to the Rights Management Service before access is granted. Such systems are bound to specific application and document types and like PKI, access rights and policies are typically managed separately from the applications that use them.

BRIEF DESCRIPTION OF THE DRAWINGS

FIG. 7 illustrates a method to register a forum user other than the host user, according to one or more embodiments.

FIG. 8 illustrates a method for enabling a forum user to auto-encrypt records, data or documents, according to an embodiment.

FIG. 9 illustrates a method for enabling a forum user to auto-decrypt communications sent from another user, according to an embodiment.

DETAILED DESCRIPTION

Figure 1A:
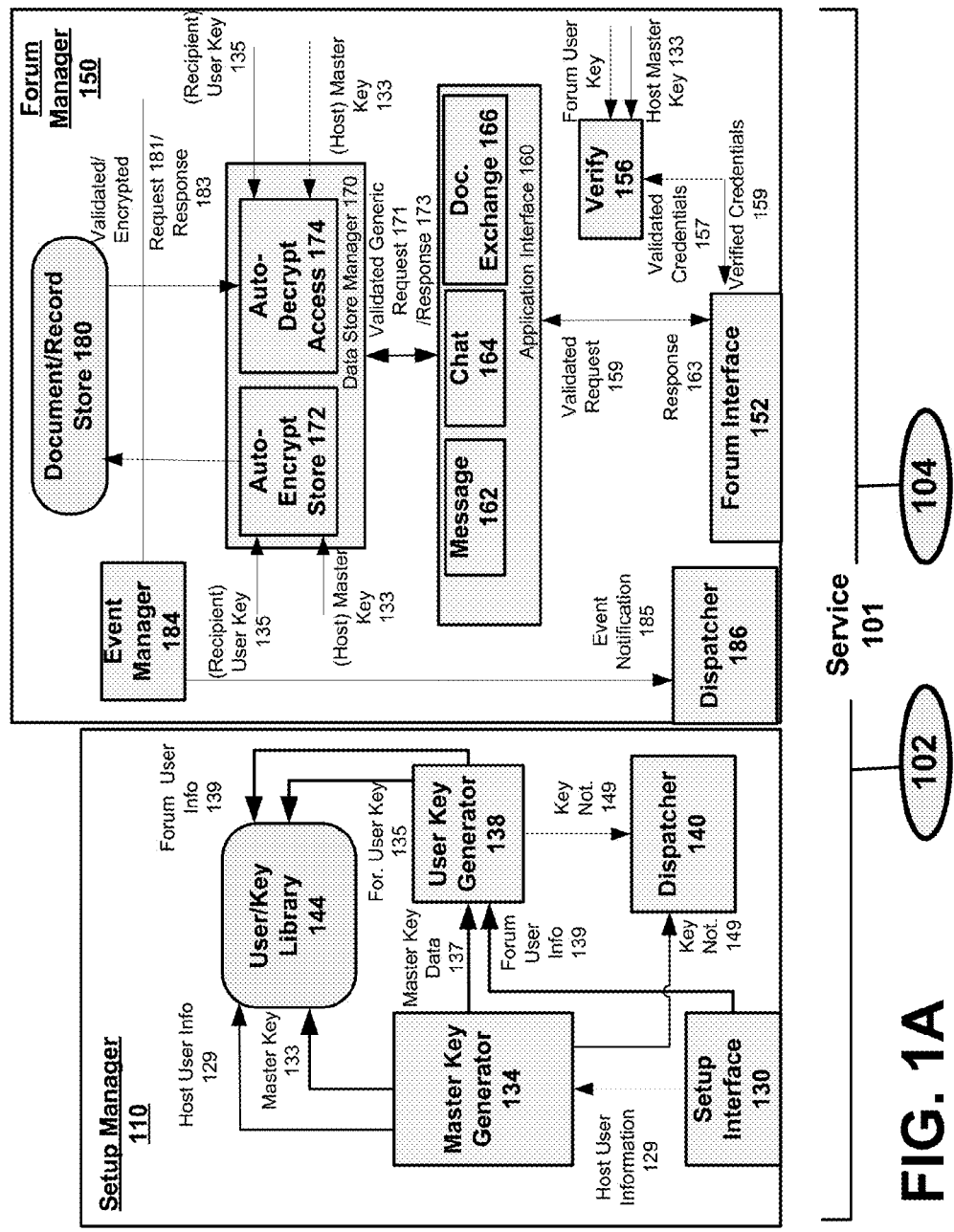
FIG. 1A illustrates a service for enabling secure exchange of information in a forum-based environment, according to one or more embodiments.

Embodiments described herein provide an online or web service in which host users are able to manage a forum for the exchange of documents, records and/or other data with their customers in a secure environment.

Embodiments described herein include a system or method that enables a plurality of users to exchange communications (such as files, data, records etc.) through a secure online forum. In one embodiment, a secure communication forum is established through use of a network resource that is available to a host user and one or more forum users. The host user is validated and assigned a master key for his or her forum. Individual users who are to participate in the forum are assigned user keys that are generated and validated from the master key.

According to an embodiment, the secure communication forum is made available for ongoing encrypted document and record exchange initiated by at least the host user at multiple instances. The secure communication forum is implemented by automating use of the user key of at least one recipient user in (i) encrypting a document or record specified by the host user for that recipient user, and (ii) enabling the recipient user to securely access the document or record using the recipient user's user key.

Among other benefits, embodiments enable host users to manage their communications to or amongst their forum users by, for example, enabling individual host users to create, validate, revoke and delete forum users as needed from the service.

According to some embodiments, the online forum's security utilizes public/private key pairs, such as provided by Public Key Infrastructure (PKI). In addition, embodiments include simplified interfaces to enable online forums that utilize the security infrastructure to be sustained and managed by the host user. As described by some embodiments, an online forum may sustain numerous sessions by the host user or his customers (who participate as forum users), and enable some or all of the participants of the forum to exchange records, documents or information using different applications (e.g. document viewer, email (or other forms of messaging), desk top sharing, and video conferencing).

According to some embodiments, an online forum is provided for the secure exchange of data between participants, and which utilizes the basic components of Public Key Infrastructure (PKI). But in contrast to conventional PKI, additional functionality is provided to simplify and make PKI more usable. Embodiments recognize that such added functionality makes PKI more available for individuals and smaller businesses who do not have the expertise or resources to manage a complete Public Key Infrastructure.

Still further, an embodiment provides a solution to enable secure, online record/document/data exchange for host users that is efficiently implementable on a small scale (as well as on a larger scale).

Moreover, unlike some conventional approaches, embodiments described herein are not limited to a specific application or document type, such as required by a typical Rights Management Service.

According to some embodiments, a web service is provided that seamlessly enables the secure exchange of confidential information between host users and their respective customers. A host user may manage the web service for his own benefit by performing tasks such (i) creating forum users for the host user's forum, (ii) validating the forum users, and (iii) disassociating or deleting forum users from established forums.

Furthermore, one or more embodiments provide for a web service that combines and seamlessly integrates components of Public Key Infrastructure (PKI), such as distributed public/private key pairs, a certificate store, and key/certificate management. Such embodiments incorporate application functions that utilize components of PKI, such as performing auto-encrypt and auto-decrypt functions.

Among other benefits, embodiments enable a secure online forum for the exchange of records and documents, that includes added functionality to simplify and add ease of use, so to be available for a class of users that include individuals and small businesses, as well as those who wish to avoid the large technological overhead required by conventional PKI security infrastructure.

Embodiments further provide for establishing an online service for multiple types of applications that can be operated by the participants of the forum with minimal user terminal management required from any of the participants. An online forum may enable participants to securely exchange documents and other information without requiring any one user (including the host) to set a password. Eliminating password exchange enables ongoing communications between a subscriber and its forum users (e.g. customers) without the overhead of password protecting every exchanged document.

In addition, one or more embodiments provide that confidential information can be protected in transit, as well as at rest (e.g. stored on a server). Such an embodiment provides a straightforward system to enable a host user to manage its information exchange with multiple customers or other forum users, without concerns of information leakage or exposure in the event of a breach. Furthermore, as more and more user data migrates onto servers in the cloud where strict controls on data privacy, protection and location are nebulous and/or undefined, user comfort is provided with knowledge that their data is explicitly protected.

Embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented through the use of modules or components. A module or component may include a program, a subroutine, a portion of a program, or a software component or a hardware component capable of performing one or more stated tasks or functions. As used herein, a module or component can exist on a hardware component independently of other modules/components, or a module or component can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage devices, such as CD or DVD devices, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

FIG. 1A illustrates a web service 101 for enabling secure exchange of information in a forum-based environment, according to one or more embodiments. A service 101 such as described may be utilized by a host user 102 (e.g. business owner) in order to establish an online forum by which documents, records, and other information can be securely exchanged with forum users 104 (e.g. customers) in a secure manner. Once established, the forum enables the participants (i.e. the host user and the customer/forum users) of the forum to exchange information securely, with ease. The service 101 includes a setup manager 110 ("setup 110") and a forum manager 150. A given user may act as a host user 102 by initiating establishment of the forum through setup 110. The host user interacts with setup 110 to establish the basis of trust and to define invitees of the forum. The invitees interact with setup 110 to establish themselves as forum users 104. The class of forum users 104 includes the host user 102. Components of setup 110 include setup interface 130, master key generator 134, user key generator 138, dispatcher 140, and user/key library 144. The setup interface 130 enables the host user 102 and the forum users 104 to register or establish themselves with service 101 on a trusted basis. Among other functions, the setup interface 130 may perform functions that verify the identities of the participants, prior to their being assigned a key to access service 101, based on information such as the known phone number of the participant. The host user 102 may interact through the setup interface 130 to specify information 129 about him or herself (e.g. name or other identifying information). The master key generator 134 uses host user information 129, received from the setup interface 130, to generate a master key 133 for the host user. The host user information 129 (as provided by the host user) may be stored in the user/key library 144 in association with the master key 133 of that host user 102. Dispatcher 140 may communicate key notification 149 when a master key for a given forum has been established.

The host user 102 may also interact with the setup interface 130 to specify the invited participants to that user's forum. The invitees may be identified by name (or other identifier). According to one or more embodiments, the setup interface 130 further comprises functionality to (i) notify invitees identified by the participant, and (ii) establish or verify the identity of the responding invited participant. An invitee may respond to a notification request by interacting with the setup interface 130 and supplying the service 101 with their information ("forum user information 139"). In some implementations, the information may be verified to match that specified about the invitee by the host user. The identities of the individuals may also be verified. Once invited participants respond and are verified as the person whom the host user 102 specified, the responding participant is assigned a user key 135 by the user key generator 138. The user key generator 138 uses master key data 137 (data corresponding to or based on the master key 133) to validate the user key 135 for use in future instances. In this way, the master key 133 forms the basis of trust for the host user 102 and its customers, in that the master key 133 provides a mechanism by which the host user 102 vouches for the identities of customers that utilize corresponding forum user keys. The user key generator 138 stores the generated forum user key 135 in the user/key library 144, along with data that associates the specific forum user information 139 with the generated user key 135.

A dispatcher 140 may dispatch a notification 149 carrying or informing the invitee of the generated and validated user key 135 that will provide them with the ability to access and use the online forum.

Once participants are established as forum users 104, service 101 enables a forum for secure/private online exchanges. According to some embodiments, the forum manager 150 includes components that enable secure and private exchange of information, data, or documents amongst forum users 104. To provide such functionality, the components of the forum manager 150 include forum interface 152, application interface 160, data store manager 170 and document/record store 180. The forum interface 152 interacts with the forum users 104. In one embodiment, the forum user 104 provides some form of validated credentials (e.g. username and digital signature) to access resources of the service 101. The forum interface uses verification component 156 to verify the validated credentials 157. The verification component 156 uses the forum user key 135 and the master key 133 accessed from the user/key library 144 to perform the verification and return verified credentials 159 to the forum interface. Once the forum user 104 credentials are verified, the forum user's requests are validated and processed. The application interface 160 may handle application specific requests 159 from the forum user, depending on the data type and/or forum user application used to generate the request. The application interface 160 includes a messaging application interface 162, a chat application interface 164, and a document application interface 166. Each application interface may handle incoming requests to access or submit data of a particular data type for use in the forum. Examples of data of a particular type include, for example, an email that includes a document attachment. In such case, the messaging and document application interfaces 162, 166 may process and handle the incoming request. A request 159 to encrypt and store may be received by the application interface 160 in a particular format/data type, then converted into a generic request format 171. A response to an access request, on the other hand, may be handled by (i) decrypting an encrypted response 183 (e.g.

record, document) using auto-decrypt 174, when it is in generic (or non-application specific form); (ii) receiving the decrypted response 173 at the application interface 160 and converting the data to a particular form or type (or associating it with a particular application) using one of the application interface components; (iii) communicating the decrypted application-specific response 163 to the forum interface 152 where it is accessed or viewed by the forum user. Other types of applications may be incorporated into the application interface 160, such as desktop sharing, voice telephony and video conferencing.

For submit requests, where, for example, messages are sent to an intended recipient (with or without attachment), the data store manager 170 includes or enables auto-encrypt functionality 172, in which the submitted data is automatically encrypted using the recipient user key 135. The master key 133 is used to verify the validation of user key 135 before it is used for encryption. Submitted data is stored in the data store 180 as part of encrypted request 181. For access requests, where, for example, messages are received from a sender, the data store manager 170 includes or enables auto-decrypt functionality 174, in which the accessed data is automatically decrypted using the recipient user key 135. The master key 133 is used to verify the validation of user key 135 before it is used for decryption. Access data is retrieved as an encrypted response, and handled by the auto-decrypt 174. As mentioned, the decrypted response 173 is outputted by auto-decrypt 174, and converted by application interface 160 into an application specific data type, from which the forum user 104 can access and use the data through the forum interface 152.

According to some embodiments, access operations on the data store 180 are monitored by event manager 184. When, for example, a forum user has a message and/or document for another forum user, his submit request (when his submitted record or document is posted) is monitored by the event manager 184, which in turn triggers an event notification 185 to be sent out by the dispatcher 186. The event notification 185 may correspond to, for example, a notification from the host user 102 to one of the other forum users 104 (or vice-versa) that a document awaits review. Still further, one or more embodiments provide that event notification 185 and dispatcher 186 combine, with components of a forum user's terminal, to automate or make programmatic the notification and transmission/store of new records/document/information for the recipient forum user. For example, a message or document communicated to a particular forum user may automatically be delivered to the forum user's terminal using components of the forum user's terminal (as described with an embodiment of FIG. 2B) as well as an automated implementation of the event manager 184.

Once setup is complete, the forum users (including host user 102) can use forum user keys 135 to access the forum manager 150. According to one or more embodiments, each master key 133 and forum user key 135 is composed of a private key (never shared) and a public key (sharable with everyone). As described below, the host user's master key 133 is used to digitally sign the forum user's 'certificate'. The host user's forum user key identifies the host user as a user of the service, and it is with the forum user key 135 that the host user 102 interacts with the forum manager 150 to perform standard cryptographic operations, such as signing, encryption, decryption and verification. In contrast, customers 104 require only one forum user key 135 to access the forum manager 150 and perform cryptographic operations.

Figure 1B:
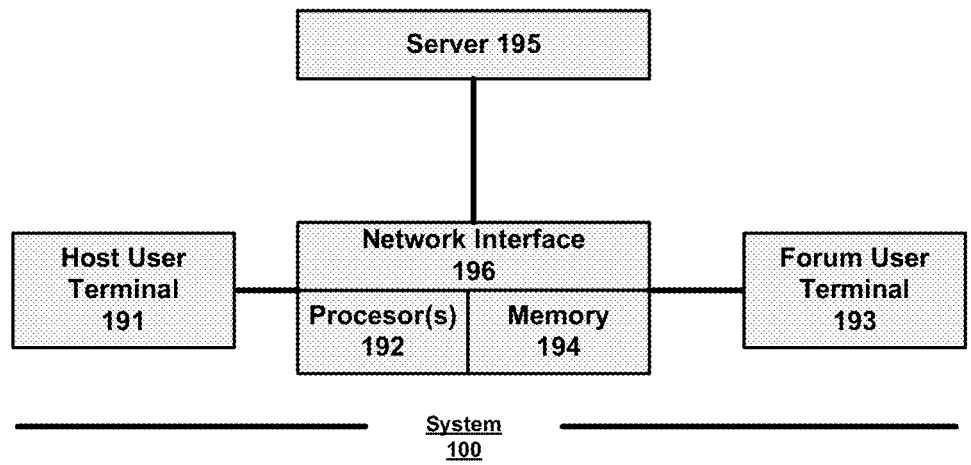
FIG. 1B illustrates a system that incorporates components of a service such as FIG. 1A, under an embodiment.

FIG. 1B illustrates an embodiment in which a system 100 includes a combination of distributed hardware components that include the service 101. The system 100 includes one or more processors 192, memory resources 194 and network interfaces 196 for enabling exchange of communications (e.g. secure or encrypted communications) across local or wide area networks (such as the Internet).

According to an embodiment, the processor(s) 192, memory resources 194 and network interface 196 used to implement system 100 may be distributed on multiple machines, including on one or more servers 195 that provide service 101 (see FIG. 1A). In order to interact with the service 101, each class of users may include terminals 191, 193 to enable the particular forum participant (host user 102 or forum user 104) to perform functions provided by either setup 110 or forum manager 150. In an embodiment, the host user terminal 191 includes programming such as described with an embodiment of FIG. 2A. Likewise, the forum user terminal(s) 193 may include programming such as described with an embodiment of FIG. 2B.

As an alternative or variation to an embodiment such as depicted, functionality that is shown to be provided through programming on either of the terminals 191, 193 may be combined with service 101. Thus, for example, in some embodiments, the host user 102 and the forum user 104 can interact with service 101 through a standard web browser, rather than through specialized programming. Still further, as another alternative, in other embodiments, the terminals 191, 193 of the respective host user 102 and forum users 104 carry some or all of the functionality specified with service 101 in FIG. 1A.

Figure 2A:
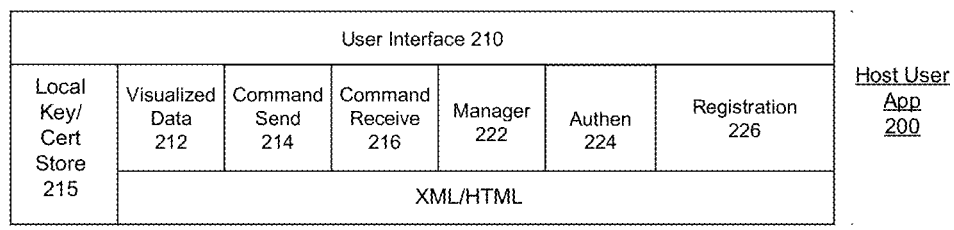
FIG. 2A depicts components for implementing host user functionality in connection with a service such as described in FIG. 1A, under an embodiment.

FIG. 2A depicts components for implementing host user functionality in connection with a service such as described in FIG. 1A, according to an embodiment. In one embodiment, host user functionality is implemented by a host user application 200, running on the host terminal 191. Accordingly, as shown and described, the host user application 200 may comprise components that form or interact with forum interface 152 (see FIG. 1A). Alternatively, the host user application 200 may be provided as a web-component, such as one that is integrated with service 101 (FIG. 1A) and operable through a standard web browser.

In an embodiment, host user application 200 includes a user interface component 210 that provides (i) visualization 212 of previously sent/received data, (ii) command interface 214 to send data, (iii) command interface 216 to receive data, and (iv) forum user manager 222. The command interface 214 enables the user to compose and/or select data that is to be communicated and posted (or otherwise provided) on the forum to one or more selected recipients. Use of command interface 214 may trigger auto-encrypt functionality that resides on or is provided by the service 101. With reference to an embodiment of FIG. 1A, the command interface 214 transmits a selected and/or composed record to the service 101, where it can follow, for example, a sequence in which the request is verified and validated (forum interface 152), made application generic (application interface 160), encrypted (encrypt 172) and stored (document/record store 180). Likewise, the command interface 216 is operable to make a request to access an encrypted record or document. The response to the access request may follow a sequence in which the response is retrieved in encrypted and application-generic form from the data store 180, decrypted (using decrypt 174), associated with an application (application interface 160), then communicated to the forum user via the forum interface and the host user application 200 (being operated as a forum user). In some implementations, the command interface 216 enables the response retrieval to be made automatic or programmatic, in response to an event notification 185 or user command. Numerous data formats and protocols may be used to initiate send/receive commands via the encryption layers of the system 100. For example, as described with embodiments of FIG. 8 and FIG. 9 and elsewhere, a secure forward format may be used to send and receive data from service 101.

The forum user manager 222 is configured to enable the host user 102 to manage its forum users through inputs (e.g. graphic object selection, text input). The host user may, for example, delete or revoke forum users from participating in the forum. Commands made through the interface can result in the specified (revoked or deleted) forum user in being disassociated with the established forum of the host user 102.

Authentication component 224 authenticates the host user as needed. A registration component 226 may also be included to form a part of, or alternatively to interact with, the setup interface 130, when the host user sets up or manages a forum. In some implementations, registration component 226 may be an optional security layer that can be used in connection with unregistered service.

According to an embodiment, the host user interactions with the service 101 are initiated through the host user application 200, and encapsulated in standard XML and/or HTML and transported with HTTP over a secure TLS/SSL connection. Use of TLS/SSL provides server authentication and transport level encryption to ensure that interactions with the server remain private.

Figure 2B:
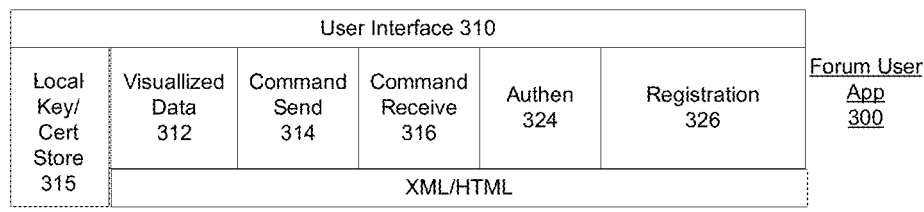
FIG. 2B depicts components of a forum user functionality for interacting with a service such as described by FIG. 1A, under an embodiment.

FIG. 2B depicts components for implementing forum user functionality in connection with service 101 (see FIG. 1A), under an embodiment. The forum user application 300 is similar to the host user application (described with an embodiment of FIG. 2A), with the exception that the forum user application does not enable management functions regarding defining the participants of the forum user (e.g. adding or removing forum users). In one embodiment, the forum user functionality is implemented as forum user application 300, running on the forum user terminal. Accordingly, as shown and described, the forum user application 300 may comprise components that form or interact with forum interface 152 (see FIG. 1A). Alternatively, the forum user application 300 may be provided as a web-component, such as one that is integrated with service 101 (FIG. 1A). Similar to host user application 200, the forum user application 300 includes a user interface component 310 that provides (i) visualization 312 of previously sent/received data, (ii) command interface 314 to send data, and (iii) command interface 316 to receive data. Authentication component 324 authenticates the forum user when it communicates with the service 101. A registration component 326 may also be included to form a part of, or alternatively to interact with, the setup interface 130, when the forum user subscribes to the service. In some implementations, registration component 326 may be an optional security layer that can be used in connection with unregistered service. According to an embodiment, the host user interactions with the service 101 are initiated through the forum user application 300, and encapsulated in standard XML and/or HTML and transported with HTTP over a secure TLS/SSL connection. Use of TLS/SSL provides server authentication and transport level encryption to ensure that interactions with the service 101 remain private.

With respect to embodiments described, the transfer of data through system 100 may be implemented so as to be limited between the host user and the recipient selected by the host user. As an alternative or variation, the forum user can communicate back to the host user. Still further, in some implementations, forum users (other than the host user) can communicate with one another.

A system such as described with FIG. 1A through FIG. 2B may leverage existing trust relationships when establishing PKI rather than relying on outside third parties to verify a particular user's identity. Although a host user's identity is confirmed and verified by the service 101, a host user already has a relationship with the forum users (e.g. its clients) and can therefore vouch for their identity within the community of users established by the host user.

Methodology

Embodiments described below describe numerous methods or techniques by which a service or system such as described with FIG. 1A through FIG. 2B may be operated, according to one or more embodiments. When applicable in describing such methods, reference may be made to elements or numerals described with FIG. 1A through FIG. 2B, for purpose of illustrating suitable elements for implementing a step or sub-step being described.

Figure 3:
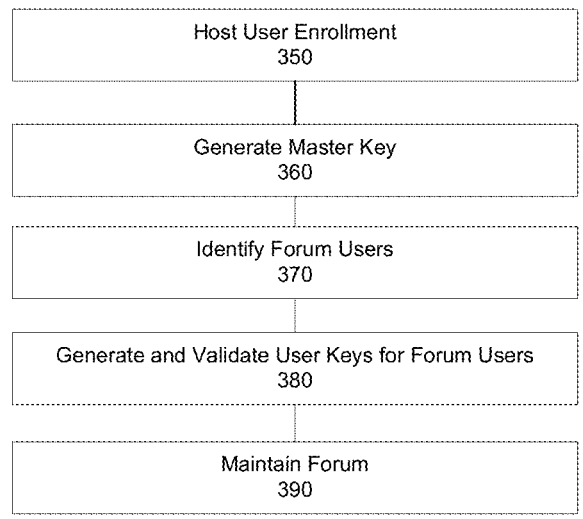
FIG. 3 illustrates an overview of a process performed in providing an online forum, such as described with FIG. 1A or FIG. 1B.

FIG. 3 illustrates an overview of a process performed in providing an online forum, such as described with FIG. 1A or FIG. 1B. According to an embodiment, the host user enrolls in the service 101 (step 350). In order to enroll, the host user may operate a web browser or browser application on a terminal that includes additional programming or functionality described with FIG. 2A. The host user 102 may access a website to enroll with service 101. Once the host user accesses the website, additional functionality, such as described with FIG. 2A, may be provided to the host user by way of, for example, download or browser plug-in.

Once the host user enrolls, a master key is generated and associated with the host user (step 360). The host user is also provided a user key that enables the host user to participate in the forum as a forum user.

During or subsequent to the enrollment process of the host user, the host user can specify forum users that are to be provided access to the service 101 in association with the master key and the particular host user (step 370). The host user may specify, for example, a legal name, an email address and/or phone number for each specified forum user. The service 101 may use the contact information to contact the identified individuals as invitees. Alternatively, the host user may contact the persons and provide them with information (e.g. URL and/or registration password) for accessing the service. In the latter case, the host user may contact the invited individuals directly in order to specify a registration password that the individual will need in order to register as a forum user.

Subsequently, some or all of the forum users access the service to enroll. In order to enroll, the forum user's may need to authenticate themselves as invitees (e.g. provide password), and then have their identities verified. Identity verification may be performed in any one of numerous ways. For example, the forum user may receive a programmatically generated phone call on a mobile device, the phone number being specified by the host user, and then be required to enter information into the website that the forum user hears over the phone.

When the invited participant enrolls, he is assigned a user key, which is validated by the master key (step 380). The user key is used by the service 101 on subsequent logins to identify the person as a forum user associated with the host user and the master key.

The online forum created for the host user and the forum users is maintained for a duration that can be undefined, and extends beyond individual sessions initiated by one or more of the users (step 390). In order to enable subsequent forum communications, each user (host and forum) uses their respective user key to either post or access information (data, documents, files, records) through the forum. The user keys are asymmetric public-private key pairs. Communications intended for and encrypted with the public key of one of the users of the forum can only be decrypted with the private key of that user. In this way, the host user does not need to be concerned with sharing a password with other forum users (who may be his customers), but can rely on the public-private paired nature of the asymmetric user key in order to maintain the trust required for the forum.

Figure 4:
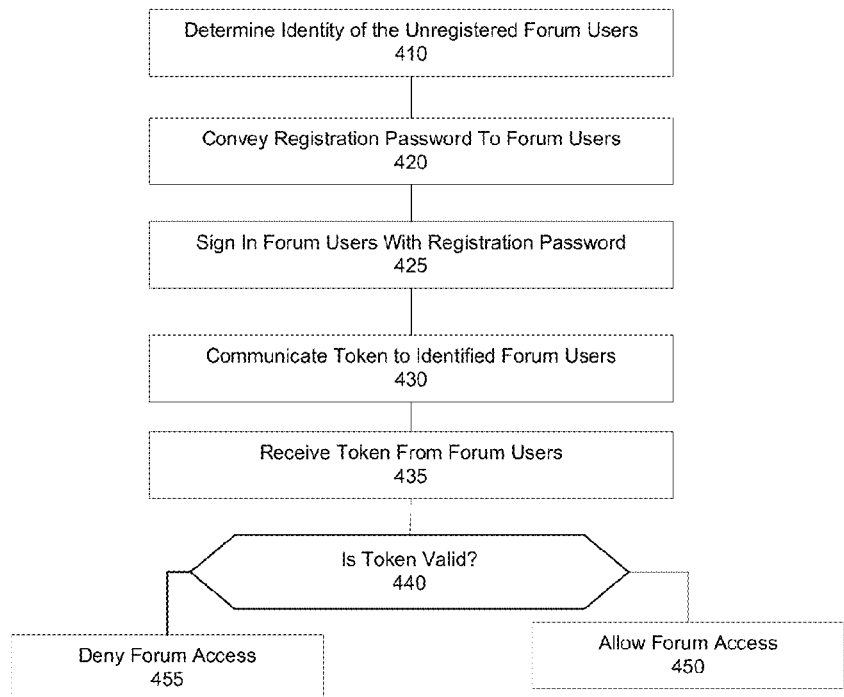
FIG. 4 illustrates an authentication process that may be implemented for unregistered or temporary use of a system such as described by FIG. 1A through FIG. 2B.

FIG. 4 illustrates an authentication process that may be implemented for unregistered or temporary use of a system such as described by FIG. 1A through FIG. 2B for the purpose of user registration. An authentication process such as described may be implemented in part by, for example, the authentication components 224, 324 described with the host user application 200 (FIG. 2A) or forum user application 300 (FIG. 2B). According to one or more embodiments, unregistered or temporary usage may be enabled or established (i) for the host user, and/or (ii) by the host user for some or all of the forum users identified by the host user. Thus, in one embodiment, both unregistered/temporary users and registered/permanent users can be granted access to a service such as provided by system 100. Since registration is where keys are created and trust is established, a strong form of authentication may be required of unregistered users of the service 101.

For unregistered forum users (including the host user), an embodiment provides that the identity of the unregistered forum user is first determined or confirmed (step 410). The forum user's identity may be confirmed by, for example, telephone. Such confirmation may entail, for example, confirming the telephone number of the forum user, then calling the forum user to prompt the forum user to interact with the service 101 in a manner that can be verified and/or monitored. When the forum user's identity is confirmed, the system 100 may convey a registration password to the forum user (step 420). In one embodiment, the service operator may convey the host user registration password by speaking with the host user directly. Similarly, the host user may convey the forum user registration password by speaking with the forum user directly. The forum users (including the host user) may then use the registration password to sign in (step 425). Other forms of credential exchange and verification may also be used.

In one implementation, the service 101 then communicates a protected token to all users for subsequent temporary use with a forum (step 430). In one implementation, this token is in form of an encrypted cookie that contains the user's identity and a timestamp identifying when authentication was completed. Subsequently, when the user presents this token to the service in a subsequent request (step 435), a determination is made as to whether the token (e.g. cookie) is valid (step 440). The determination may be based from the timestamp and/or identity contained within the token. As long as the token is valid, the user is granted access (step 450). Otherwise, access is denied (step 455). To ensure that access is not available indefinitely, one or more embodiments provide that service 101 will only grant access within a well defined window that starts with the timestamp. To maintain continuity of access during registration, the token may be renewed each time access is granted. If no requests occur during the window, then the token expires.

Figure 5:
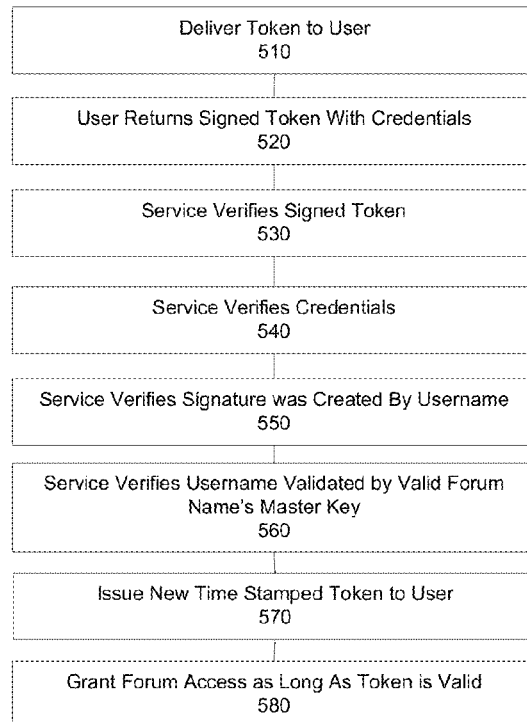
FIG. 5 illustrates a process in which permanent/registered users are authenticated with a service or system such as by FIG. 1A through FIG. 2B.

FIG. 5 illustrates a process in which permanent/registered users are authenticated with a system such as described in FIG. 1A. According to one or more embodiments, registered users may provide credentials in the form of a three-tuple {forumname, username, signature}. A forumname uniquely identifies a forum managed by a specific, registered host user; a username uniquely identifies a registered forum user created within the forum identified by forumname; and a signature contains a digital signature that is cryptographically unique to the username, thus providing proof that the credentials are coming from whom they identify.

According to an embodiment, when a permanent/registered user requests access, the service 101 first delivers a unique token (e.g. protected cookie) to the forum user (step 510). The user then digitally signs this token with its private key and returns the signed token along with its credentials back to the web service (step 520). The service 101 confirms the validity of the token (e.g. the cookie) (step 530) and then verifies the credentials by first checking that username is known to the service 101 (step 540). If so and with knowledge of username's public key, the service 101 verifies that the token signature was indeed created by username (step 550). If so, the web service subsequently checks that forumname is known to the service 101 and with knowledge of forumname's master public key verifies that username was indeed validated by the master key of forumname (step 560). When the verifications are complete, service 101 delivers a new token (e.g. protected cookie) to the user containing the user's identity and a timestamp indicating when authentication was completed (step 570). The user can present this token to service 101 (e.g. via forum interface 152) with each subsequent request and as long as the identity and timestamp in the token are valid, the web service will grant access (step 580).

Registration Methodology

Figure 6:
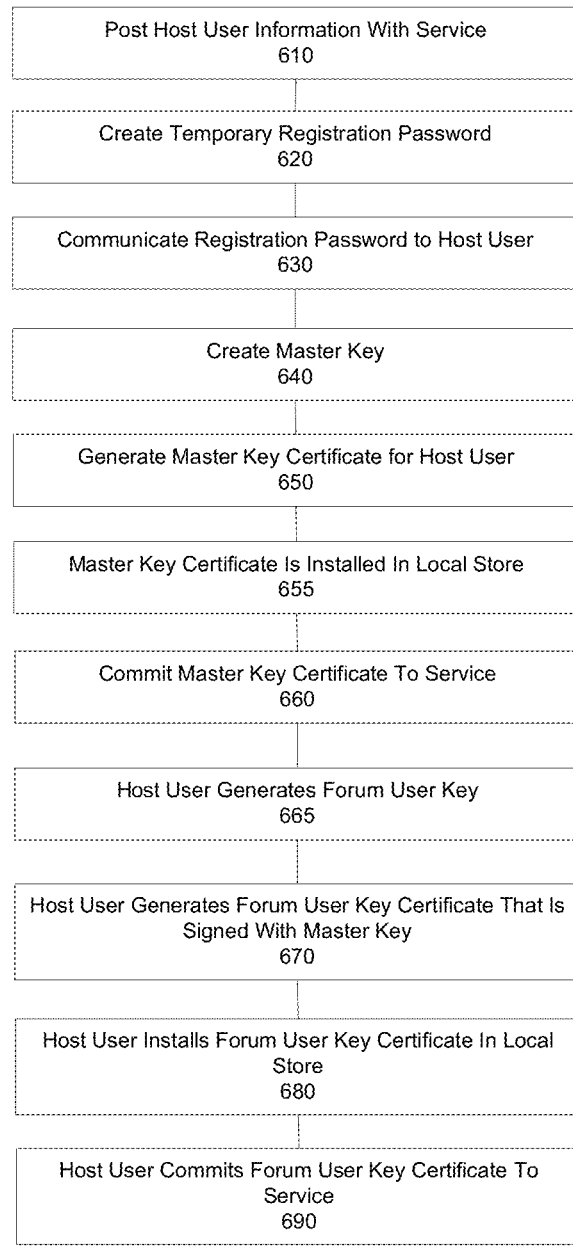
FIG. 6 illustrates a process by which a host user registers with a web service, according to an embodiment.

FIG. 6 illustrates a process by which a host user is able to register with a web service, such as provided by a service or system described with other embodiments. A method such as described with FIG. 6 may be performed using system 100, including the host user application 200 of FIG. 2A. Accordingly, reference may be made to elements of FIG. 1A and FIG. 2A for purpose of illustrating suitable components or elements for performing a step or sub-step.

Initially, information about a host user is posted to the service 101 (step 610). System 100 creates a temporary registration password for the host user (step 620). In one implementation, a cryptographic hash of the password is stored with service 101 for later reference when the host user attempts registration.

The registration password is communicated to the host user (step 630). The conveyance of the information may be done with added layers of security. The conveyance is performed in a manner that assures that only the intended host user receives the registration password. In one implementation, dispatcher 140 sends a notification, such as by way of an email, to the host user 102. The notification email includes a URL link to the web service portion of system 100. When the link is activated (presumably by the host user 102 selecting the link), the service can execute an identity confirmation protocol, such as calling (programmatically or by service operator) a phone number associated with the host user and having the respondent convey information/perform act(s) that are only known/available to the host user 102.

After successful authentication, the master key generator 134 of system 100 creates a master key 133 for the host user 102 (step 640). The master key 133 can be stored locally in the local key store 215 of the host user application 200, as well as with the forum user/key library 144 of the service.

As part of generating a master key for the host user, the system 100 generates a key certificate request for the host user 102 using the master key. A master key certificate request combines host user information 129 with the public portion of master key 133 into one component that is signed with the private portion of master key 133, thus binding the master key and host user information together. In one embodiment, the registration component 226 may generate the certificate request. In this case, the master key certificate request is posted along with a unique master key identifier to service 101 for validation. As discussed in more detail, the master key 133 forms the basis of trust for the host user and its forum users, in that it enables the host user 102 to vouch for the identities of its forum users. Service 101 can use the master key to digitally sign/validate user certificates when assigning forum user keys 135. Since keys and certificates are inextricably linked, signing/validating certificates is equivalent to signing/validating keys.

Upon receipt of the master key certificate request, the service 101 checks the request and key identifier, and then allows the host user to commit the certificate request to the service 101. The service then converts the request to a master key certificate and signs/validates the certificate with its own signing key (step 650). Service 101 forwards the master key certificate to user/key library 144 and returns it to the host user application 200. Upon receiving the master key certificate from the service 101, the host user installs the certificate in its local certificate store 215, where it is linked with the previously generated master key 133 (step 655). The host user then commits the certificate to the service (step 660) and the host user master key registration process is then complete.

In order to register as one of the forum users 104, the service 101 and/or host user application 200 creates, on behalf of host user 102, a forum user key 135 (FIG. 1A) (step 665). The forum user key 135 can be stored in the local key store 215 (FIG. 2A) of the host user as well as with the forum user/key library 144 of the service. According to an embodiment, the host user application 200 generates a forum user key certificate request using the forum user key 135 and forum user information 139. A forum user key certificate request combines forum user information 139 with the public portion of forum key 135 into one component that is signed with the private portion of forum user key 135, thus binding the forum user key and forum user information together. The host user application 200 then converts the request to a certificate and signs/validates the certificate with the host user's master key 133 (FIG. 1A) (step 670). The forum user key certificate is sent along with a unique forum user key identifier to the web service for checking. This forum user key and certificate identify the host user as a user of the service. This enables enable basic cryptographic operations for the host user 102. If the web service 101 determines the certificate and key identifier are ok, it forwards the forum user key certificate to the user/key library 144 and notifies host user 102. Host user 102 then installs the certificate in the local certificate store (see local store 215) where it is linked with the previously generated forum user key (step 680). The host user 102 then commits the certificate to the service 101, thereby completing registration (step 690). According to an embodiment, completing the registration process results in service 101 enabling host user 102 as a registered user.

FIG. 7 illustrates a method to register forum users 104 other than the host user, according to one or more embodiments. The forum user registration is initiated with the host user 102 creating a new forum user record. In creating the record, the host user posts a description (name, phone number, email address) to the web service (step 710). The web service 101 may create a temporary registration user to match. Along with the temporary registration user, the host user 102 may create a temporary registration password for the forum user. When the temporary registration password is posted (in protected form to the web service 101), the web service 101 may send a notification to the identified forum user 104 (step 720). In one implementation, the notification may be in the form of a notification message (e.g. email) that contains or provides a link to web service 101. The forum user 104 can use the link to begin the registration process. In one implementation, the host user 102 conveys the temporary registration password to the forum user 104 using the telephone, for example, by speaking with the forum user directly, or by leaving the forum user a voice message or sending a text message.

The forum user 104 then initiates and completes the registration process. In one implementation, the forum user 104 initiates the registration process by authenticating with the service 101 using the temporary credentials. After successful authentication, the service 101 and/or forum user application 300 create a forum user key 135 (step 730). The forum user key 135 can be stored in the local key store 315 (FIG. 2B) of the forum user as well as with the forum user/key library 144 of the service. According to an embodiment, the forum user application 300 generates a forum user key certificate request using the forum user key 135 and forum user information 139, and posts the request along with a unique key identifier to the web service for validation. The web service 101 checks the certificate request and key identifier. The forum user 104 then commits the certificate request to the web service 101. In one embodiment, system 100, operating the host user application 200, converts the forum user key certificate request to a certificate and signs/validates the certificate with the master key 133 associated with the host user 102 (step 740). The forum user key certificate is then posted with the web service 101 where it is forwarded to the user/key library 144.

The web service sends the forum user's user key certificate and the host user's master key certificate to the forum user's terminal (which may include the installed forum user application). The forum user key certificate is installed in the local store 315 (FIG. 2B) where it is linked to the previously generated forum user key (step 750). The forum user also installs the host user's master key certificate in the local certificate store 315 (FIG. 2B) but without linking it to a key. The presence of the host user's master key certificate and the forum user's user key certificate in the forum user's local certificate store 315 (FIG. 2B) ensure that the forum user's user key and certificate are valid and usable by the forum user's terminal, as embodiments recognize that for a key and certificate to be valid, the entire chain of trust up to a trusted root certificate must be present and valid. When both certificates have been installed, the forum user commits the user key certificate to the web service 101 (step 760). The web service 101 enables the forum user to act as a registered user. The web service then sends "Registered" to the host user 102 to show that the particular customer registration is complete.

With registration complete, the forum users (including the host) may leverage the computer-implemented privacy and trust formed via the web service 101. The exchange of information between the forum users (including the host) provide a secure online forum.

According to some embodiments, a basic component of a forum exchange (e.g. between host user and forum user) is a package comprising primarily of a subject, a message, and zero or more attachments. Such a package is referred to as a secure forward. Each attachment of the package may be its own secure forward that is (i) without other attachments, and (ii) composed of a file name (instead of a subject) and file data (instead of a message). According to one or more implementations, a secure forward is (i) stamped with the date and time when it is sent and received, (ii) uniquely named using the result of a cryptographic hash over the recipient, sender, subject line or filename and sent timestamp. This unique name is called a hash name. Confidential portions of a secure forward exchanged through the online forum are encrypted, based on a symmetric cipher (e.g. AES-256-CBC), the session key of which is encrypted using the asymmetric cipher (e.g. RSA-2048) enabled by the forum user keys created during the registration processes of the host user 102 and the forum users 104. Still further, in one implementation, a secure forward is viewable only by the sender and recipient, that is, the session key is encrypted using only the sender's and recipient's public key.

To ensure the integrity of a secure forward, system 100 passes the unencrypted data through a cryptographic hash function (e.g. SHA-1) to create a message digest. The digest is digitally signed with the private key of the sender. The recipient's terminal (e.g. interacting with service 101 using the forum user application 300) passes the decrypted data through the same hash function as that used by the sender in order to verify the sender's signature using the sender's public key. If the signature is valid the data is known to originate with the sender and known not to have been modified since it was signed. To ensure the integrity of the timestamps and prevent forwarding, the sender's terminal (e.g. using the host application 200 or forum user application 300) first passes the recipient, sender and hash name (which includes the sent timestamp) into the hash function. If the timestamp or sender or recipient were ever changed, signature verification would fail.

When a recipient has successfully received a secure forward package, the system 100 (either service 101 or the terminal application of the recipient) sets the received timestamp and updates the digest with the value of the timestamp. System 100 then computes a signature using the new digest value. Any attempt to modify the received timestamp would result in an invalid recipient signature.

To enable cross references between related secure forward packages, a set of reference hash names is also included. This would, for example, enable a query from the web service 101 of secure forward exchanges related to one subject.

In order to address practical limitations of HTTP and network connections in general, a secure forward communication may be partitioned into segments, each of which is encrypted/sent and received/decrypted independently. In the event of a failed or interrupted network connection or the desire of the user to suspend, segmenting the data enables the components performing the data transfer to conveniently pick up where they left off. The segment count is included as an element of a secure forward to facilitate this handling.

A secure forward may also encapsulate natively encrypted file data, i.e. a file that was encrypted using the recipient's public key in a format that is understood by a native application (e.g. Adobe Reader). In this case the file data is not decrypted but rather forwarded as is to the native application for decryption and rendering.

Send/Encrypt

After authenticating with their forum user keys as described above, host users and forum users may now freely exchange confidential data.

FIG. 8 illustrates a method for enabling a forum user to auto-encrypt records, data or documents, according to an embodiment. In particular, an embodiment such as described provides a mechanism by which a user is able to auto-encrypt communications (e.g. records, documents etc.) using a secure forward mechanism as described. The sender selects the forum user that is to be the recipient (step 810). The selection may include the sender providing the subject, message and attachments (if any) of the secure forward communication.

In response to some user action (like the user 'pressing send'), the sender terminal then triggers the secure forward to be sent (either from the user's terminal or from the service 101) (step 820).

The sender's terminal, in conjunction with resources of the service 101, perform the auto-encrypt functions (step 830). A timestamp is associated with the sent communication (marking the time the communication was sent). In one implementation, upon sending the communication, the intended recipient's certificate is requested from the service 101. Upon receipt of a valid recipient's certificate from the service 101, one embodiment provides that the sender's terminal computes the hash name, initializes the symmetric cipher session key, and encrypts the session key for the sender and the recipient. The sender's terminal then encrypts the subject (or file name in case of an attachment) and initializes the hash and the segment index.

For each segment available in the message (or file data in case of an attachment), the sender's terminal reads the segment data, hashes it, encrypts it, and posts the encrypted data along with the segment index to the service 101, and then finally, increments the segment index. After receiving an affirmative response from the service 101, the sender's terminal repeats the process for a next segment (if another segment is available).

When all segments have been posted, the sender's terminal finalizes the hash to create the digest value and signs it using the sender's private key. Finally, the sender's terminal posts the summarizing information which includes elements of a secure forward communication. After receiving an affirmative response or acknowledgement from the service 101, the sender's terminal can proceed with attachments (if any) or any further attachments, repeating the process from the computation of the hash name.

When the entire secure forward communication (including attachments) has been encrypted and sent, the service 101 sends a notification message to the recipient. The contents of the notification message directs the recipient to receive its confidential package. The contents of the notification message may include a URL link to the web service.

Receive/Decrypt

FIG. 9 illustrates a method for enabling a forum user to auto-decrypt communications sent from another user, according to an embodiment. As described with an embodiment of FIG. 9, some embodiments utilize a secure forward communication mechanism for receiving communications as part of forum participation.

In an embodiment, a recipient first selects the sender and hash name of interest (the decrypted subject is shown in advance to make this selection meaningful) (step 910). The recipient may select the sender and hash name because the recipient received a notification from the service 101 that a communication is pending for the recipient. The recipient's terminal then decrypts the session key using the recipient's private forum user key (step 930). The session key may be decrypted using summarizing information, which may be requested by the recipient's terminal.

With the session key available, the recipient's terminal decrypts the subject (or file name in case of an attachment) and sets up for decryption by initializing the hash and the segment index. According to an embodiment, for each segment specified in the total segment count, the recipient's terminal requests an encrypted segment from the service 101. Upon receipt of the encrypted segment, the recipient's terminal decrypts the segment, hashes the unencrypted data, renders the segment data (or writes to a file in case of an attachment) and increments the segment index.

When there are no more segments to receive, the recipient's terminal finalizes the hash to compute the digest and then verifies the sender's signature using the newly computed digest and the sender's public key (step 940). The recipient's terminal may request the sender's certificate from the service 101 to obtain the sender's public key. If the signature is valid, the recipient's terminal notes the received timestamp, updates the digest with this timestamp, and computes a new recipient signature using the recipient's private key. The recipient's computer posts the timestamp and recipient signature to the service 101 for storage. Upon receipt of an affirmative response or acknowledgement from the service 101, the recipient's terminal receives attachments (if just finished receiving the message) or any further attachments, repeating the process from the requesting of summary information.

According to an embodiment, when the entire secure forward communication (including all attachments) have their received timestamp set, the service 101 sends a notification message to the sender notifying it that the secure forward has been delivered to the intended recipient. Assuming that the sender's terminal is actively monitoring the list of secure forward communications, the sender's terminal receives an automatic update showing the timestamp of the last secure forward communication received.

Implementation Examples and Usage Scenarios

The following usage scenario may be implemented, in accordance with embodiments described. A host user that wishes to establish a secure method of exchanging confidential information with one or more forum users (e.g. an accountant preparing a tax return for an individual may require the exchange of financial documents) first registers with the web service. As part of the registration, the host user creates a master key and certificate request and registers them with the web service. After validating the certificate request, the web service converts the request to a certificate and signs the certificate to create the host user's master key certificate. This certificate and the host user's master key form the basis of trust for the host user and its clients: the host user vouches for the identities of all its clients and uses this master key to digitally sign their certificates. In the second step of registration the host user creates a forum user key and certificate and registers them with the web service. This forum user key and certificate identify the host user as a user of the service.

Subsequently, the host user's clients also register with the web service. In an embodiment, clients first create a forum user key and certificate request and register them with the web service. When available, the host user validates the certificate request by converting it to a certificate and signing the certificate with its master key. The host user then registers the signed user certificate with the web service. The client subsequently retrieves its signed user certificate and the host user's master certificate from the web service and completes registration.

In another embodiment, the host user creates a forum user key and signed certificate on behalf of the client but does not register them with the service. Rather, once the forum user key and signed user certificate along with the host user's master certificate have been physically delivered to the client, the client acts by registering them with the web service directly.

With registration complete, the host user and clients begin to use the web service's main application. In a generic embodiment, the application provides three types of functions: send, receive and manage. According to one or more embodiments, (i) the send function enables a user to readily encrypt and send confidential information to the host user and any client created by the host user; (ii) the receive function enables a user to receive and decrypt confidential information sent by the host user or any client created by the host user; (iii) the manage function, only available to the host user, enables the host user to create, validate, revoke and delete his online client list as needed. In one implementation, all confidential and encrypted information is sent to the web service and stored temporarily in an encrypted data store until the recipient receives it; the encrypted information does not persist on the server. In an alternative embodiment, the host user may archive the encrypted data with the web service.

In one implementation, the send and receive functions are used to transfer files through the secure online forum. By performing the send function, the sender (host or forum user) encrypts and sends a desired file (e.g. document, media file). Similarly, the receive function enables a user to receive and decrypt files.

In another implementation, the send and receive functions are used to transfer messages that include a subject, a message body, and one or more file attachments.

As another usage implementation, a host user can utilize a system such as described with FIG. 1B to simply send data to itself, in order to archive confidential documents for later retrieval. In this case there are no clients involved and no exchange of confidential information takes place.

As mentioned in various embodiments, numerous types of records, documents and data may be encrypted, stored and/or communicated to others using a system such as described with FIG. 1 and above. In addition to sending/receiving self-contained documents or records, some embodiments may incorporate documents/records that link to other documents/records or data sources (e.g. HTML page). In such embodiments, the source document may be requested or communicated via the system 100. The document may be used to trigger other requests for linked items (e.g. other documents) when the source document is rendered or displayed, or when the user clicks on a link when viewing the document. The other items may originate from the document/record store 180, and thus be subject to the auto-decrypt functionality, as if the document was expressly requested or designated to be communicated to the recipient. In one embodiment, the host user (or alternatively, another forum user that publishes the document) specifies various content items for the document in form of embedded links that can be or are automatically selected by the recipient or forum user of the published document. Each content item that is linked in the source document may be specified by the publisher (e.g. the host user). In one embodiment, each linked content item that is uploaded by the publisher (e.g. the host user) is subjected to auto-encrypt functions and uploaded to the document/record store 180. The recipient of the source document (who renders the document after auto-decrypt functions are performed) may select the linked content item. In selecting the linked content items, a request is generated that results in the linked content item being auto-decrypted and presented or downloaded. The download from the document/record store 180 may occur concurrently with the rendering of the source document. As an alternative or variation, the linked items are assimilated on the recipient's machine to present one document, record, or a set of documents that are linked. Still further, the source document may specify linked content items that reside outside of the service. For example, the linked content items may correspond to images or text hosted on external web pages, but which are assimilated or presented with the source document after the source document is auto-decrypted and presented to the user.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for enabling secure communications between a plurality of users, the method being implemented by one or more processors and comprising:
   (a) establishing a secure communication forum through use of a setup interface between a host user and one or more forum users, in which the one or more processors validate the host user, assign the host user a master key, and assign the one or more forum users user keys for use in participating in the secure communication forum, wherein establishing the secure communication forum further comprises:
      generating the master key and a user key for the host user;
      acknowledging the one or more forum users from the host user, wherein the host user uses the setup interface to send one or more invitations to the one or more forum users to participate in the secure communication forum; and
      generating a user key for each forum user, and validating each user key with the master key, wherein each forum user responds to the one or more invitations over the setup interface;
   (b) making the secure communication forum available for ongoing encrypted document and record exchange over a forum interface accessible only by the host user and the one or more forum users;
   wherein making the secure communication forum available includes responding to the host user and the one or more forum users interacting with the forum interface by automatically (i) encrypting a document or record specified by the host user for a respective one of the one or more forum users, (ii) verifying that the respective forum user's user key is validated by the host user's master key, and (iii) based on the verification of the respective forum user's user key, enabling the respective forum user to securely access the document or record.

2. The method of claim 1, further comprising:
   in response to an access request by the respective forum user over the forum interface, automatically decrypting the encrypted document or record and providing the decrypted document or record to the respective forum user over the forum interface.

3. The method of claim 1, wherein the setup interface and the forum interface are part of an online service that hosts the secure communication forum.

4. The method of claim 1, wherein automatically encrypting the document or record includes programmatically, and transparently to the host user, using the respective forum user's user key to encrypt the document or record.

5. The method of claim 1, wherein generating the user key includes enabling each user to store the user key locally.

6. The method of claim 1, wherein making the secure communication forum available for encrypted document and record exchange includes enabling the host user and the one or more forum users to securely exchange records and documents with each other.

7. The method of claim 6, wherein the forum interface enables encrypted document and record exchange to be performed by the host user and the one or more forum users by email.

8. The method of claim 1, wherein the forum interface enables encrypted document and record exchange to be performed by the host user and the one or more forum users over online chat sessions.

9. The method of claim 3, wherein the online service comprises a number of servers hosted by a third-party.

10. The method of claim 1, wherein the setup interface and the forum interface are included in a terminal of the host user.

11. The method of claim 1, wherein the user key for the host user is validated by the master key.

12. The method of claim 1, wherein the master key and each of the user keys are asymmetric public-private key pairs.

13. The method of claim 6, wherein the one or more processors verify each of the user keys as validated by the master key prior to each exchange of a document or record.

14. A system for enabling secure communications between a plurality of users, the system comprising:
   one or more processors that operate to provide:
   (a) a setup manager comprising:
      a setup interface that receives input from a host user, the input from the host user identifying one or more forum users;
      a master key generator that generates a master key and associates the master key with the host user; and
      a user key generator that generates a user key for each of the one or more forum users, each user key being validated by the master key and associated with a corresponding forum user; and
   (b) a forum manager comprising:
      a data store manager that manages a data store medium retaining information corresponding to a plurality of documents or records; and
      a forum interface to verify individual forum users that seek access to the data store medium;
   wherein the data store manager is to:
      auto-encrypt a document or record submitted by a submitting forum user, of the one or more forum users, for retention in the data store medium;
      auto-decrypt a document or record that is requested for access by an accessing forum user of the one or more forum users; and
      make the data store medium available for access to the one or more forum users over a plurality of forum user sessions.

15. The system of claim 14, wherein the one or more processors are implemented on a server as part of an online service.

16. The system of claim 15, further comprising one or more storage components on which the data store medium is provided.

17. The system of claim 15, wherein the one or more processors of the online service provide an application interface that enables a given document or record to be submitted to or rendered from the data store medium in a format corresponding to the application being used to submit or render the given document or record.

18. The system of claim 17, wherein the application interface includes a messaging interface that combines with the data store manager to provide a secure messaging forum for storing and/or communicating messages by the one or more forum users.

19. The system of claim 17, wherein the application interface includes a chat interface that combines with the data store manager to provide a secure chat forum for communicating chat messages amongst the one or more forum users.

20. The system of claim 17, wherein the application interface includes a document exchange interface that combines with the data store manager to enable a given forum user to create, modify, or view a document retained in the data store medium in a given application format.

* * * * *